United States Patent
Coldren et al.

(10) Patent No.: US 10,788,026 B2
(45) Date of Patent: Sep. 29, 2020

(54) CRYOGENIC PUMP

(71) Applicant: Caterpillar Inc., Peoria, IL (US)

(72) Inventors: Dana R Coldren, Secor, IL (US); David T Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 799 days.

(21) Appl. No.: 15/356,696

(22) Filed: Nov. 21, 2016

(65) Prior Publication Data

US 2018/0142679 A1    May 24, 2018

(51) Int. Cl.
| | |
|---|---|
| *F04B 9/10* | (2006.01) |
| *B60K 15/03* | (2006.01) |
| *F04B 15/08* | (2006.01) |
| *F04B 23/02* | (2006.01) |

(52) U.S. Cl.
CPC ............. *F04B 15/08* (2013.01); *F04B 9/10* (2013.01); *F04B 23/023* (2013.01); *B60K 2015/03013* (2013.01); *F04B 2015/081* (2013.01)

(58) Field of Classification Search
CPC ...... F04B 15/08; F04B 2015/081; F04B 9/08; F04B 9/10; F04B 9/103; F04B 23/02; F04B 23/021; F04B 23/023; F04B 49/002; B60K 2015/03013; F17C 2227/0135; F17C 2227/0142; F17C 2227/0178; F17C 2221/033; F17C 2223/0161; F17C 2265/066; F17C 2270/0165; F17C 2270/0168; F17C 2270/0173; F15B 21/04; F15B 21/042; F15B 21/0423; F15B 21/06; F03C 1/0406; F03C 1/0422
See application file for complete search history.

(56) References Cited

U.S. PATENT DOCUMENTS

| | | | | |
|---|---|---|---|---|
| 5,575,626 | A | * 11/1996 | Brown | ........... F04B 15/08 417/251 |
| 6,006,525 | A | * 12/1999 | Tyree, Jr. | ........... F04B 3/003 62/239 |
| 6,481,218 | B1 | 11/2002 | Dresler | |
| 7,223,080 | B2 | 5/2007 | Duron | |
| 8,342,820 | B2 | 1/2013 | Kwon et al. | |
| 8,915,719 | B2 | 12/2014 | Street | |
| 2004/0055316 | A1* | 3/2004 | Emmer | ........... F17C 7/04 62/50.6 |
| 2014/0178178 | A1 | 6/2014 | Besson et al. | |
| 2016/0208793 | A1* | 7/2016 | Kroeger | ........... F04B 49/22 |
| 2017/0037836 | A1* | 2/2017 | Brown | ........... F04B 23/021 |
| 2017/0058878 | A1* | 3/2017 | Brasche | ........... F04B 37/08 |

FOREIGN PATENT DOCUMENTS

| | | |
|---|---|---|
| CN | 204512439 | 7/2015 |
| WO | 2015003651 | 1/2015 |

* cited by examiner

*Primary Examiner* — Essama Omgba
*Assistant Examiner* — Christopher J Brunjes
(74) *Attorney, Agent, or Firm* — Bookoff McAndrews

(57) ABSTRACT

A cryogenic pump includes a pressurization assembly configured to be submerged in a cryogenic liquid; a hydraulic actuation assembly; and a transmission assembly in communication between the pressurization assembly and the hydraulic actuation assembly. The transmission assembly including a conduit having a first end adjacent the hydraulic actuation assembly and a second end adjacent the pressurization assembly. The conduit is configured to contain a material having a first state at the first end and a different second state at the second end.

20 Claims, 6 Drawing Sheets

CRYOGENIC PUMP

TECHNICAL FIELD

The present disclosure relates to a multi-element cryogenic pump. More particularly, the present disclosure relates to a drive assembly for a multi-element cryogenic pump and a cryogenic module, the cryogenic module including a pump.

BACKGROUND

Many stationary and mobile machines such as, for example, power generation sets, mining trucks, locomotives, marine vessels, on-highway trucks, and other machines powered by an internal combustion engine, have traditionally been fuelled by petroleum distillates, such as, gasoline or diesel fuel. Alternative fuels, alone or in combination with traditional fuels, are being used more often to fuel internal combustion engines. For example, engines may be configured to use natural gas (i.e. a hydrocarbon mixture consisting primarily of methane and other constituents such as propane, butane, and other alkanes) or petroleum gas (i.e. a hydrocarbon mixture consisting primarily of propane, butane, or a mixture of the two), alone or in combination with a traditional distillate fuel such as diesel. Because natural gas and petroleum gas occur naturally in a gaseous state at standard atmospheric temperature and pressure (hereinafter referred to as "gaseous fuel"), with relatively low densities, these gaseous fuels may be liquefied to increase the physical density; and therefore the energy density, for more efficient transportation of fuel energy compared to that of the gaseous state. These types of fuels, including liquefied natural gas (LNG) and liquefied petroleum gas (LPG), may be stored in a liquid state at cryogenic temperatures in insulated tanks, pressurized while in the liquid state, vaporized into a gaseous state, and supplied to fuel the engine. Using a cryogenic pump to increase the pressure of the fuel in the liquid state is more efficient than vaporizing the fuel and then compressing it. As used in the present disclosure, the terms "natural gas" and/or "gas" refer to hydrocarbon mixtures like those described above that are in a gaseous state at standard atmospheric temperature and pressure, regardless of the physical state of the hydrocarbon mixture at any particular time.

U.S. Pat. No. 6,481,218 (hereinafter referred to as the '218 patent) discloses a pump system for delivering cryogenic liquids. At least one pump is arranged in a container and delivers a cryogenic liquid stored in the container to a pressure housing, which is connected to a user, e.g. a motor vehicle, via an output line. The '218 patent discloses three pump elements actuated by a swash plate drive. Compressive forces are transmitted from the swash plate drive to the pump elements by connecting rods. When the stroke reverses, plungers of the pump elements return to a starting position by a spring force. A pump system of the type disclosed in the '218 patent is characteristic of a multi-element pump with a mechanical drive arrangement.

The cryogenic pump drive assembly of the present disclosure addresses one or more shortcomings that may be encountered in previously known designs.

SUMMARY OF THE DISCLOSURE

One aspect of the present disclosure includes a drive assembly for a cryogenic pump. The cryogenic pump having at least one pumping element, the pumping element including a pressurization assembly configured to be submerged in a cryogenic liquid. The pressurization assembly including a barrel disposed within a casing, and a plunger disposed within a bore of the barrel. The barrel having an inlet and a discharge and the plunger having a plunger body and one or more circumferential grooves disposed about the plunger body. The plunger being configured for reciprocating movement within the barrel so that when the plunger is moving in a first retracting direction cryogenic liquid is drawn into the bore and when the plunger is moving in a second extending direction cryogenic liquid is delivered from the discharge at a predetermined pressure. The drive assembly including a hydraulic actuation assembly and a transmission assembly. The transmission assembly being in communication between the pressurization assembly and the hydraulic actuation assembly, and the transmission assembly including a conduit passage having a first end adjacent the hydraulic actuation assembly and a second end adjacent the pressurization assembly. The conduit passage configured to contain a material having a first state at the first end and a different second state at the second end, wherein the first state of the material contained in the conduit passage is a liquid state and the second state of the material contained in the conduit passage is a solid state.

Another aspect of the present disclosure includes a cryogenic pump including a pressurization assembly configured to be submerged in a cryogenic liquid, a hydraulic actuation assembly, and a transmission assembly. The transmission assembly being in communication between the pressurization assembly and the hydraulic actuation assembly. The transmission assembly including a conduit passage having a first end adjacent the hydraulic actuation assembly and a second end adjacent the pressurization assembly, the conduit passage configured to contain a material having a first state at the first end and a different second state at the second end.

Another aspect of the present disclosure includes cryogenic module including a tank configured to hold a liquid at cryogenic temperatures and pressures. The tank including an envelope defining a storage chamber therein, a socket including a flange attached to the envelope and a wall segment extending from the flange into the storage chamber. The cryogenic module further including a cryogenic pump configured to cooperate with the socket. The cryogenic pump including a pressurization assembly configured to be submerged in the liquid, a hydraulic actuation assembly, and a transmission assembly in communication between the pressurization assembly and the hydraulic actuation assembly. The transmission assembly including a conduit passage having a first end adjacent the hydraulic actuation assembly and a second end adjacent the pressurization assembly, the conduit passage configured to contain a material being in a first liquid state at the first end and a different second state at the second end.

DETAILED DESCRIPTION

Figure 1:
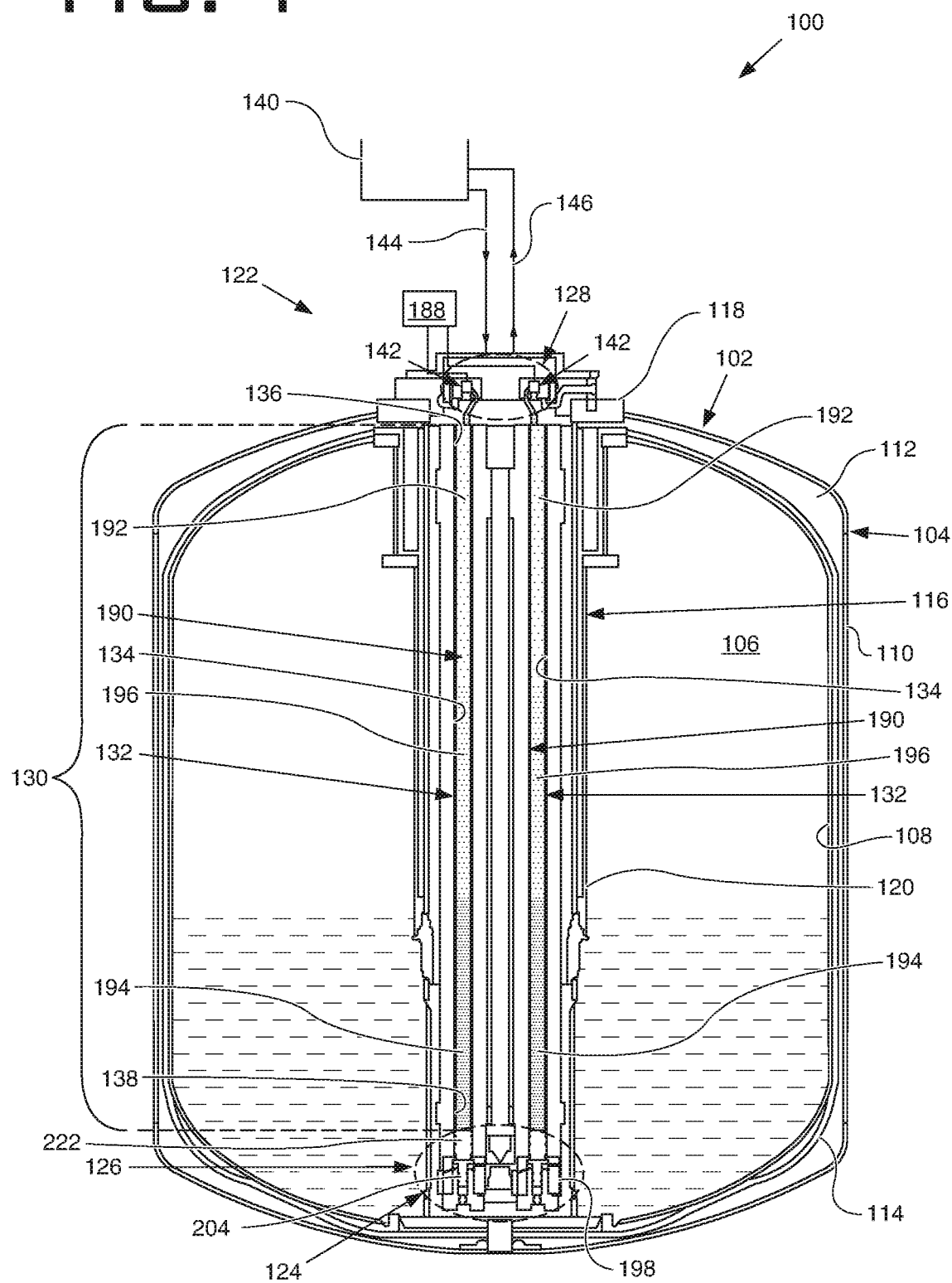
FIG. 1 is a section view of a cryogenic module showing a tank, a multi-element cryogenic pump disposed within the tank, and a drive assembly for the multi-element cryogenic pump, in accordance with an embodiment of the present disclosure.

The present disclosure relates to a cryogenic 100 module as shown in FIG. 1. The cryogenic module 100 may be used to store and supply pressurized cryogenic fluid e.g., cryogenic fuels such as natural gas to engine systems (not shown) that are used in various mobile or stationary machines, such as power generation sets, mining trucks; locomotives, marine vessels and the like. It is envisioned that the cryogenic module 100 of the present disclosure may be used in conjunction with, but are not limited to, direct injection gas (DIG) engines or port injection gas engines using diesel compression or spark ignition. However, it will be appreciated that other types of engines known in the art, and/or engines using a different ignition mode are also contemplated for use with the cryogenic module 100 of the present disclosure.

Referring to FIG. 1, the cryogenic module 100 includes a tank 102 that is configured to store a liquid, such as LNG, at cryogenic temperatures and pressures. For example, natural gas is naturally present in a gaseous state at standard temperature and pressure and can be liquefied at cryogenic temperatures of approximately −160° C. The tank 102 includes an envelope 104 defining a storage chamber 106 therein. The envelope 104 may be of double wall construction having an inner wall 108 and an outer wall 110. The inner wall 108 and the outer wall 110 may define an evacuated space 112. therebetween. An insulating blanket 114 may also be provided on the outside of the inner wall 108.

The tank 102 may further include a socket 116 including a flange 118 attached to the outside of the envelope 104, and a wall segment 120 extending from the flange 118 into the storage chamber 106. Whether the cryogenic module 100 is installed in a mobile or a stationary machine, each of which is contemplated, the gaseous fuel may be stored in a liquid state in the storage chamber 106 of the tank 102, which may be an insulated cryogenic storage chamber 106 that is pressurized at a relatively low pressure, for example, atmospheric pressure, or at a relatively higher pressure. In an example, the storage chamber 106 may be configured to store liquefied natural gas (LNG) at a temperature of about −160° C. (−256° F.) and a pressure that is between about 100 kPa and 1750 kPa, but other storage conditions may be used depending upon specific requirements of an application.

The cryogenic module 100 may further include a cryogenic pump 122 configured to cooperate with the socket 116. The cryogenic pump 122 may further include a pressurization assembly 124 including one or more pumping elements 126, a hydraulic actuation assembly 128 operatively associated with the pressurization assembly, and a transmission assembly 130 positioned in communication between the pressurization assembly 124 and the hydraulic actuation assembly 128.

Figure 2:
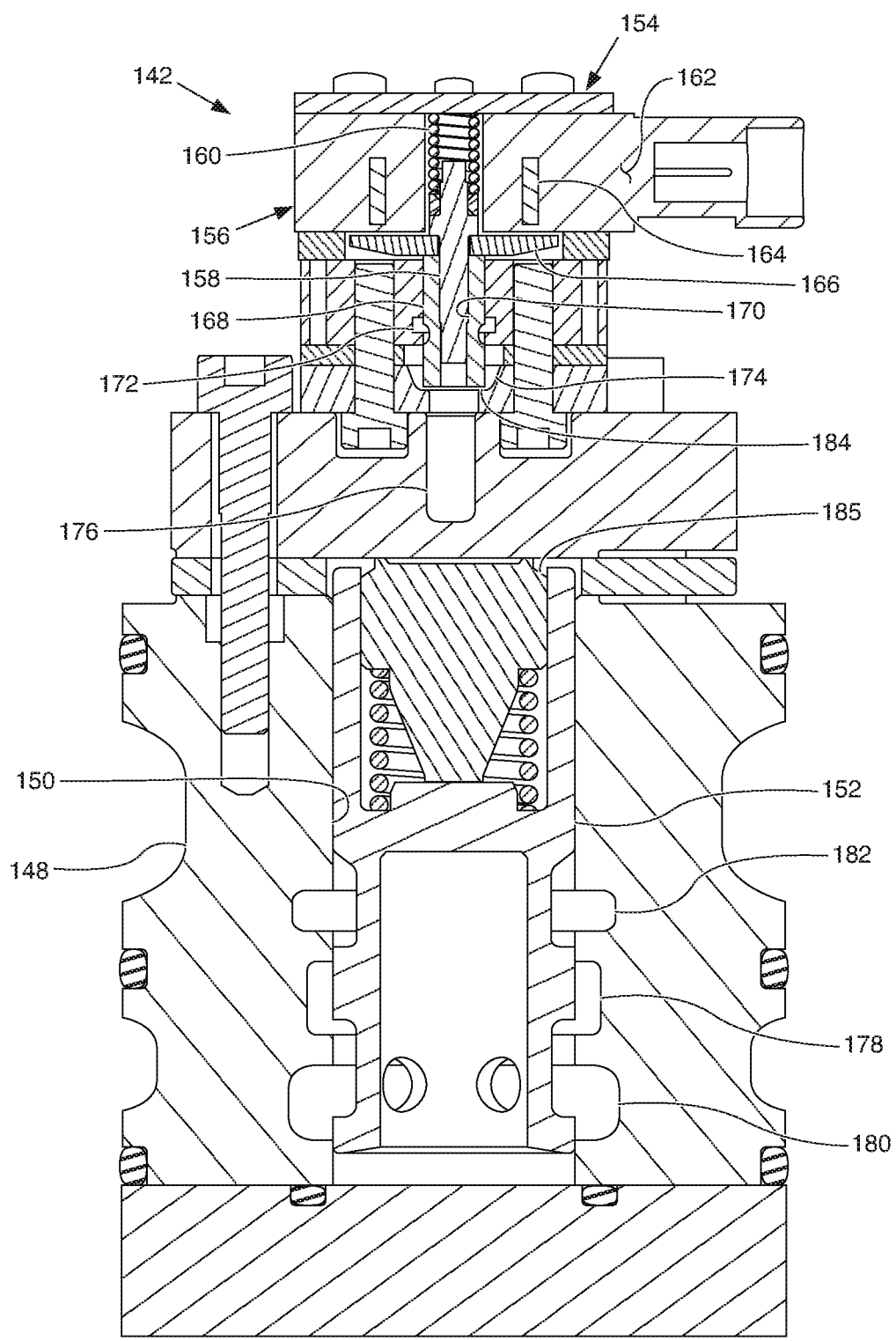
FIGS. 2 and 3 are section views of a control valve and actuator for the drive system of the cryogenic pump illustrating two operating conditions.

The transmission assembly 130 may include one or more conduits 132, each conduit 132 being operatively associated with a pumping element 126 and an actuation assembly 128, and defining a conduit passage 134 providing communication between the hydraulic actuation assembly 128 and the pumping element 126. Specifically, each conduit 132 may be positioned so that a first end 136 is connected to the hydraulic actuation assembly 128 while a second end 138 of each conduit 132 is connected to the pumping element 126. Moreover, as shown in FIGS. 1 and 2, each of the conduits 132 may be arranged in a spaced apart relation to one another and configured to extend within the socket 116 of the cryogenic pump 122. Although multiple conduits 132, each corresponding to one of multiple pumping elements 126, are being disclosed, for simplicity, the present disclosure will hereinafter be explained with reference to a single conduit 132 and pumping element 126 of the cryogenic pump 122.

Figure 4:
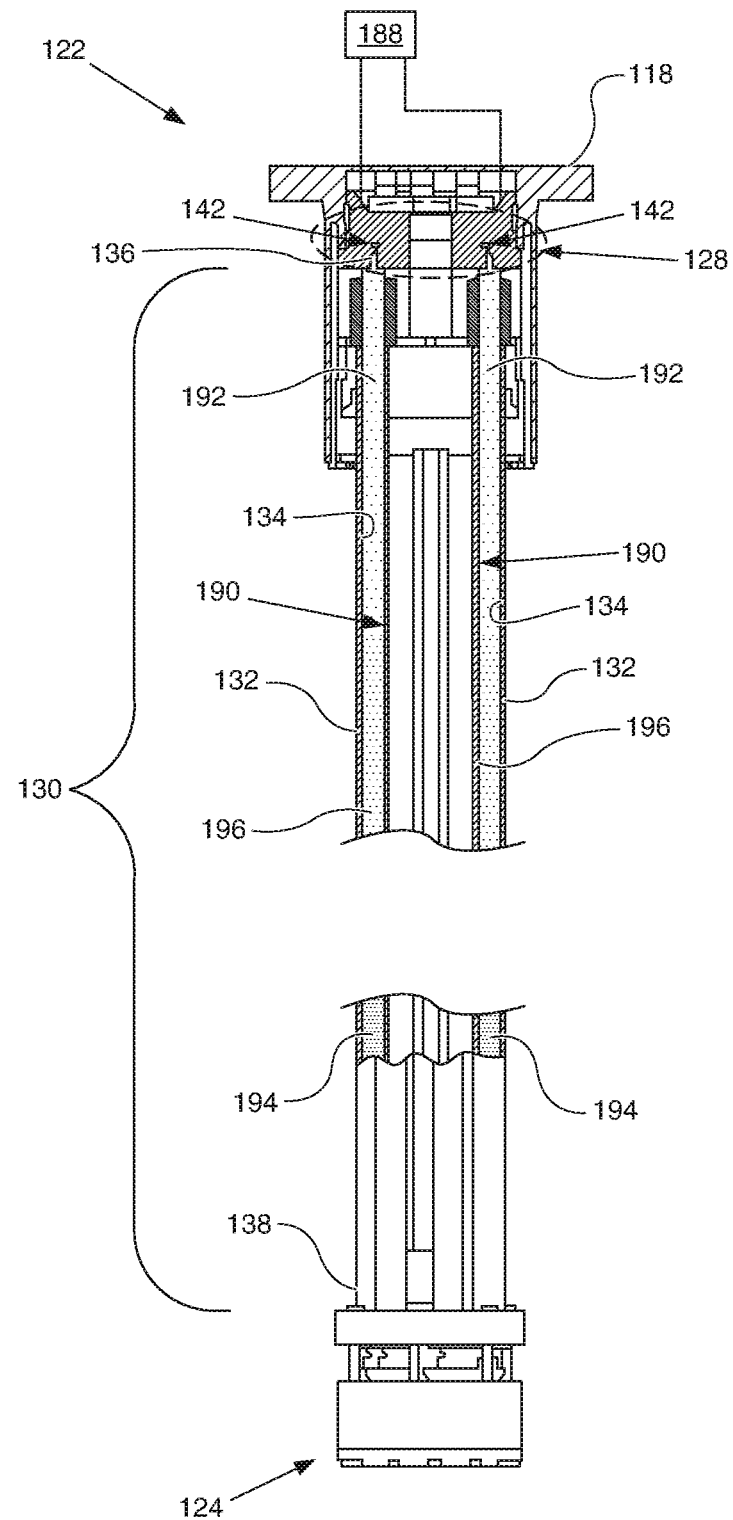
FIG. 4 is a section view of the cryogenic pump, in accordance with an embodiment of the present disclosure.

As further shown in FIG. 1, the hydraulic actuation assembly 128 may be connected to a source 140 of working fluid by way of a control valve 142. The hydraulic actuation assembly 128 includes a control valve 142 that may be connected to the fluid source 140 via a supply line 144 and a return line 146. Two control valves 142 are shown in FIGS. 1 and 4, corresponding to a pair of conduits 132 visible in the respective section views. The supply line 144 may be configured to selectively supply the working fluid from the fluid source 140 to the conduit 132 via the control valve 142 while the return line 146 selectively allows a return of the working fluid from the conduit 132 via the control valve 142 into the fluid source 140. The working fluid disclosed herein may be hydraulic oil, diesel fuel, lubricating oil, or any other relatively incompressible fluid consistent with the present disclosure and dependent on specific requirements of a particular application.

Figure 3:
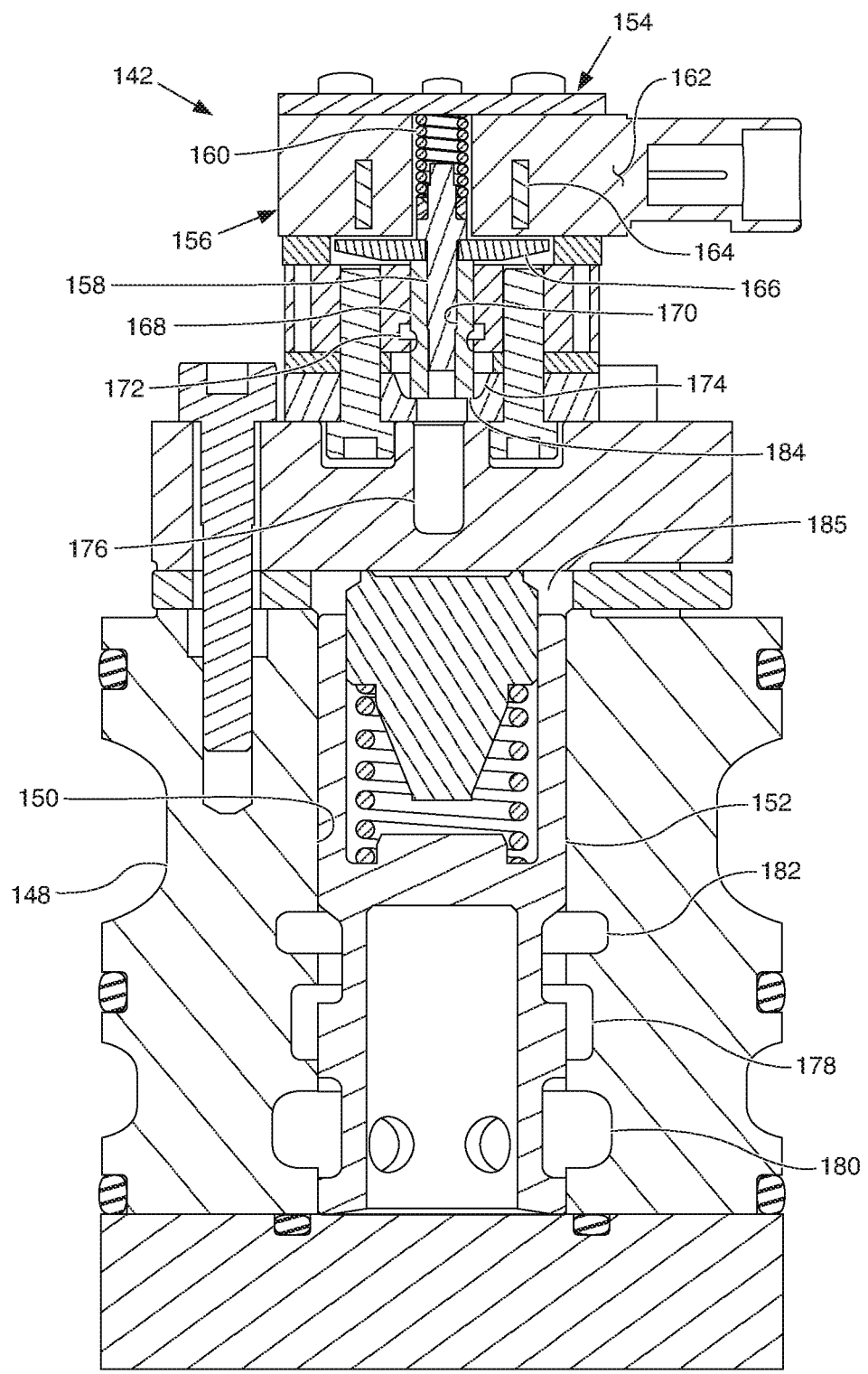

Each control valve 142 may be configured to connect and isolate its associated conduit 132 from the working fluid from source 140. Referring to FIGS. 2 and 3, the control valve 142 may include a valve body 148 defining a valve bore 150. The valve bore 150 being configured to receive a valve element 152. To actuate movement of the valve element 152 within the valve body 148, and thereby selectively direct working fluid flow, each control valve 142 can be operatively associated with an actuator 154. Each actuator 154 may be configured to be mounted on top of the valve body 148, as shown in FIGS. 2 and 3. Alternatively, actuator 154 may be remotely mounted from control valve 142.

The illustrated actuator 154 is an electromechanical pilot actuator, but other actuator types such as actuators using piezoelectric elements, pneumatic elements, etc., can also be used. The actuator 154 may include a solenoid 156 that, when energized, retracts a pin 158 that is reciprocally disposed at least partially in the solenoid 156 and includes a return spring 160. The solenoid may include a ferric core 162 and a coil 164. The pin 158 may include an armature 166 and be configured to reciprocate within a pin guide 168 defining a guide bore 170. The guide bore 170 may be fluidly isolated from a working fluid supply passage 172, a control valve supply outlet 174, and an actuator drain outlet 176. In the illustrated embodiment, the pin guide 168 forms two poppet valve seats that, depending on the activation state of the solenoid 156, fluidly connect or isolate the various fluid passages.

The control valve 142 is shown in two operating positions in FIGS. 2 and 3. When the control valve 142 is actuated as shown in FIG. 2, the valve element 152 moves upward in the valve body 148 to open the conduit supply passage 178 to the flow of high pressure working fluid so the first end 136 of the conduit 132 receives the high-pressure working fluid (see FIG. 4). The valve bore 150, which accommodates the valve element 152, may be fluidly connected to a fluid supply passage 180, which supplies pressurized fluid to the conduit 132. The valve bore 150 may also be fluidly connected to a control valve drain passage 182 (partially shown in FIGS. 2 and 3) for draining pressurized fluid. During operation, when the valve element 152 is disposed at the fill position shown in FIG. 2, the control valve drain passage 182 is fluidly isolated from the fluid supply passage 180. In the draining position, as shown in FIG. 3, the valve element 152 moves to fluidly block the fluid supply passage 180 and in turn fluidly connect the conduit supply passage 178 with the control valve drain passage 182. In this operating position, fluid is allowed to flow out through the top of the conduit 132, through the conduit supply passage 178 and into the control valve drain passage 182, from where it is drained (e.g. back to the working fluid source).

The actuator 154 associated with the each control valve 142 may be configured to move the valve element 152 between the fill and drain positions. For example, depending on the activation state of the solenoid 156, the position of the pin 158 within the pin guide 168 may operate between an activation position and a drain position. In an activation position (FIG. 2), a lower valve seat 184 opens as the armature 166 moves upward, which places the control valve supply outlet 174 in fluid communication with the actuator drain outlet 176, which may be in communication with the interior of the valve bore 150 of the control valve 142 and depressurizes a control chamber 185 above the valve element 152, causing the valve element 152 to move upwards by hydraulic force under the valve element 152 that is pressurized by working fluid supply passage 180 from the drain position (FIG. 3) to the fill position (FIG. 2).

Thus, when the pin 158 is in the activated position, the valve element 152 is in the fill position. Similarly, when the pin 158 is deactivated, the control valve supply outlet 174 is placed in fluid communication with the working fluid supply passage 172, which pressurizes the control chamber 185 above the valve element 152 to substantially the same pressure as the area under the valve element 152 and allows a valve spring 186 to extend the valve element 152 in the valve bore 150 and thus vent the conduit supply passage. Thus, when the pin 158 is in the deactivated position, the valve element 152 is in the drain position (FIG. 3). In other embodiments, the actuators 154 can include solenoid-operated plungers that connect directly to the valve elements 152 to cause movement of the valve elements 152 within the valve bore 150. It should be appreciated that the actuators, valve elements, and conduit passages may communicate with each other in configurations different than as illustrated in FIGS. 2 and 3.

A controller 188 (see FIG. 4) may be operatively associated with each control valve 142, or more particularly, with each actuator 154. The controller 188 may be in the form of a microprocessor, an application specific integrated circuit (ASIC), or may include other appropriate circuitry and may have memory or other data storage capabilities. The controller 188 may also include or be capable of performing functions, steps, routines, data tables, data maps, charts and the like saved in and executable from read-only memory or another electronically accessible storage medium to control the cryogenic pump 122 and/or its hydraulic system. Although the controller of the present disclosure is shown as a single, discrete unit, in other embodiments, the controller and its functions may be distributed among a plurality of distinct and separate components. The controller can also be operatively associated with various sensors, inputs, and controls arranged about the systems with electronic communication between components being established by communication lines such as wires, dedicated buses, and radio waves, using digital or analog signals.

Referring now to FIG. 4, the transmission assembly 130 operatively associated with the hydraulic actuation assembly 128 may include a conduit 132 operatively associated and in fluid communication with each control valve 142. The conduit 132 may define a conduit passage 134 configured to contain a material 190 for transmitting a force to its associated pumping element 126. In the exemplary embodiment of the present disclosure, each conduit 132 is in fluid communication a control valve 142 via the conduit supply passage 178 as shown in FIGS. 2 and 3. Therefore, the exemplary material 190 contained within conduit 132 may be the same working fluid of the hydraulic actuation assembly 128, although a different may also be used.

Referring back to FIG. 1, because the cryogenic pump 122 is positioned within the tank 102 so that the hydraulic actuation assembly 128 is exposed to ambient conditions outside of the tank 102, and the pressurization assembly 124 is submerged in a liquid at cryogenic temperatures, a thermal gradient forms along the length of the cryogenic pump 122, with the hydraulic actuation assembly 128 being relatively warmer than the pressurization assembly 124. The thermal gradient also results in the first end 136 of each conduit 132 being warmer than the second end 138, and therefore the material 190 adjacent the first end 136 is warmer than the material adjacent the second end 138.

Material 190 may be selected so that it may have a first state 192 at or near the first end 136 of conduit 132 and a second state 194 at or near the second end. Material 190 may also have an intermediate state 196 present, forming a transition zone between the first state 192 and the second state 194. For example, if the material 190 comprises the working fluid of the hydraulic actuation assembly 128 described above (e.g. oil, diesel fuel, etc.), then material 190 would be a liquid phase in the first state 192, a solid phase, or more likely in this example a waxy phase, in the second state 194, and a transition region or intermediate state 196 having a mixture of the first state and the second state or a "slush" phase.

Figure 5:
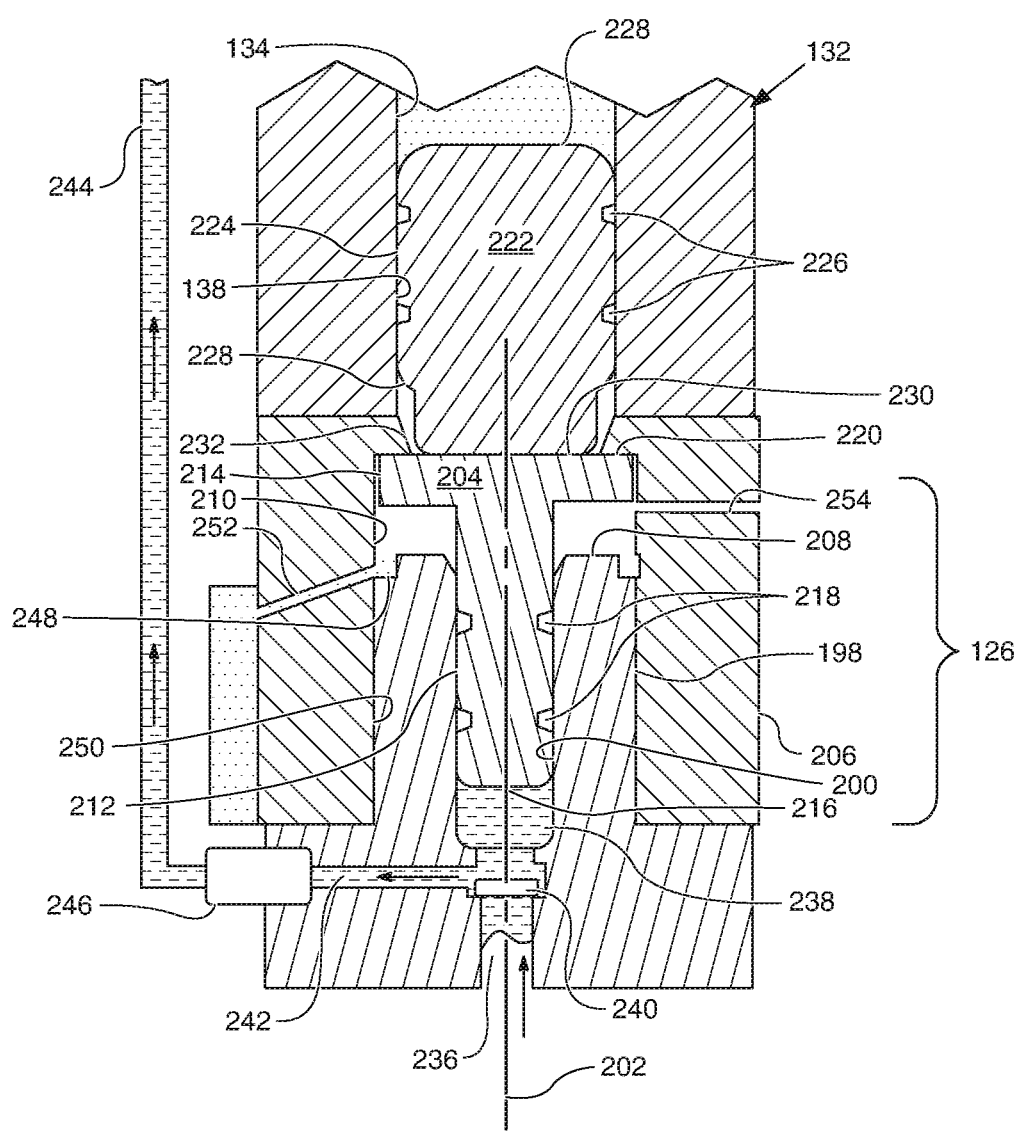
FIG. 5 is an enlarged section view of a pressurization assembly, in accordance with one embodiment of the present disclosure.

Referring now to FIG. 5, the pressurization assembly 124 (as shown in FIGS. 1 and 4) may include one or more pumping elements 126 configured to increase the pressure of a cryogenic fluid stored in the tank 102. Each pumping element 126 may be operatively associated with a control valve 142 and conduit 132, as described above. Each pumping element 126 may include a barrel 198 defining a bore 200 having a longitudinal axis 202. A plunger 204 may be positioned within the bore 200 and configured to reciprocate within the bore 200. The barrel 198 may be constructed as a component to receive plunger 204, as shown in the exemplary embodiment, so that the barrel 198 is configured to be received within a casing 206. The casing 206 being configured to cooperate with the second end 138 of conduit 132.

The barrel 198, in particular a free surface 208 of the barrel 198, and the casing 206 may define a plunger chamber 210. Although the present example illustrates the casing 206 as being configured to cooperate exclusively with a single barrel 198 and plunger 204 combination, it should be understood that for a multiple-element cryogenic pump, a single, integral block may be configured to receive multiple barrel 198 and plunger 204 combinations of the pressurization assembly 124. For example, a six-element cryogenic pump may be constructed so that a single block functions as a casing 206 configured to receive six barrel 198 and plunger 204 combinations.

The plunger 204 may be configured to include a plunger body 212 and a plunger head 214. Plunger head 214 may be configured to have a larger surface area than a distal end 216 of plunger body 212 to provide pressure intensification. The plunger 204 may also include one or more circumferential grooves 218 disposed about the plunger body 212. Additionally, plunger head 214 may be configured to cooperate with a travel stop 220 or seat formed by an upper portion of casing 206, thereby limiting the range of reciprocating movement by the plunger 204 in the barrel 198. Travel stop 220 may be configured to extend radially inward toward the longitudinal axis 202 forming a rim or lip to cooperate with the plunger head 214.

A piston 222 may be positioned within conduit 132 and operatively associated with the plunger 204. The piston 222 may include a piston body 224, a first surface 228 at one end of the piston body 224 configured to be in contact with the material contained within conduit 132, and a second surface 230 at a second end of the piston body 224 configured to be in contact with the plunger 204. The piston 222 may further include one or more circumferential grooves 226 disposed about the piston body 224.

Additionally, the piston 222 may include a sealing surface 228 configured to cooperate with a sealing surface 232 of the travel stop 220. For example, the sealing surface 2228 of the piston 222 may be formed as an arcuate, toroidal, or semispherical surface configured to cooperate with a conical sealing surface 232 of the travel stop. When, for example, the storage chamber 106 of the tank is empty, there is no fluid pressure to provide an upward force acting on the plunger 204. Therefore, the piston 222 is at a fully extended position resting on the travel stop 220 with the sealing surface 228 of the piston 222 engaging the sealing surface 232 of the travel stop 220, preventing material 190 in the conduit passage 134 from entering the plunger chamber 210.

The barrel 198 may further include an inlet port 236 in fluid communication with the storage chamber 106 of the tank 102 and configured to allow cryogenic fluid stored in the tank 102 to enter a pumping chamber 238. The pumping chamber 238 being defined by the bore 200 and the distal end 216 of the plunger body 212. An inlet check valve 240 may be provided at the inlet port 236 configured to allow cryogenic fluid to flow only in a direction from the storage chamber 106 of the tank 102 to the pumping chamber 238. Additionally, the barrel 198 may include a discharge port 242 in fluid communication with a high pressure outlet passage 244 and configured to direct pressurized cryogenic fluid flow from the pumping chamber 238 for processing and/or end use. A discharge check valve 246 may be provided at the discharge port 242 configured to allow cryogenic fluid flow only in a direction from the pumping chamber 238 to the high pressure outlet passage 244.

The barrel 198 may also include a collector 248 configured to trap any material 190 that may migrate past the piston 222 and the plunger head 214. In the illustrated embodiment shown in FIG. 5, the collector 248 may take the form of a notch disposed about an outer circumference of the barrel 198 at the free surface 208 and located adjacent an inner sidewall 250 of the casing 206. A drain port 252 in fluid communication with the collector 248 may be provided through the casing 206 to allow removal of material 190 from the pumping element 126. In the illustrated embodiment, the collector 248 is configured so that material 190 that migrates by the piston 222 and the plunger head 214 is pressed between an underside of the plunger head 214 and the free surface 208 of the barrel 198 on a pressurization or pumping stroke and is directed into the collector 248 and through the drain 252, where the material 190 may be directed to a reservoir, such as the reservoir for the working fluid or a waste reservoir that may be emptied when the cryogenic pump 122 is serviced.

A vent passage 254 may be provided to allow cryogenic fluid in a gaseous or vapor state that has migrated past the plunger body 212 to be evacuated from the plunger chamber 210. Vent passage 254 may be configured in fluid communication with the storage chamber 106 of the tank 102.

Figure 6:
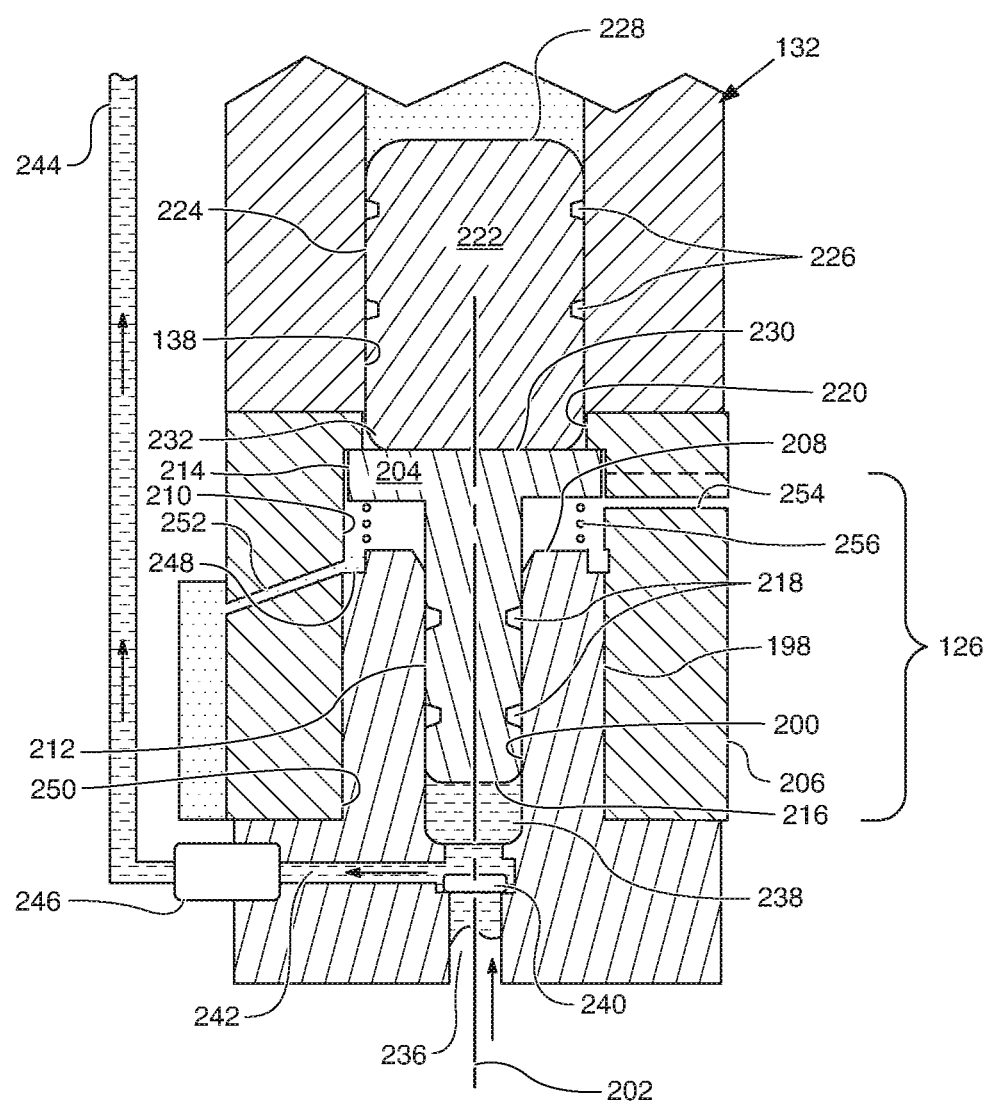
FIG. 6 is an enlarged section view of a pressurization assembly, in accordance with another embodiment of the present disclosure.

In the illustrated embodiment described above, pumping element 126 is configured so that the pressure inside the storage chamber 106 of the tank 102 is sufficient to force cryogenic fluid through the inlet port 236 and into pumping chamber 238, thereby returning the plunger 204 to a retracted position after a pressurization or pumping stroke. Alternatively, referring to FIG. 6, pumping element 126 may further include a spring 256 configured to assist the plunger 204 return to the retracted position after a pressurization or pumping stroke by applying an upward bias force to the plunger 204. In the illustrated embodiment of FIG. 6, the spring 256 is positioned between the plunger head 214 and the free surface 208 of the barrel 198. During a pressurization or pumping stroke, the spring 256 is compressed between the plunger head 214 and the free surface 208 of the barrel 198. After the pressurization or pumping stroke, the spring 256 returns to its initial state, providing an upward bias force to the underside of the plunger head 214, and thereby assisting return of the plunger 204 to its retracted position.

INDUSTRIAL APPLICABILITY

The disclosed cryogenic module 100 and multiple-element cryogenic pump 122 system may find potential application in any cryogenic fluid application, but particularly may be applied to a system of storage and supply of LNG fuel to an internal combustion engine. One skilled in the art will recognize, however, that the disclosed cryogenic pump 122 could be utilized in relation to other fluid systems that may or may not be associated with a power system. Operation of the cryogenic module 100 and cryogenic pump 122 system will now be explained.

In an application using a cryogenic module 100 and multiple-element cryogenic pump 122 of the present disclosure to provide LNG fuel to an internal combustion engine, an engine control module (ECM) senses demand from the engine. The ECM may be the controller 188 of the present disclosure or the ECM may be a separate component in communication with the controller 188.

Upon sensing engine demand for fuel, the controller 188 initiates a pumping stroke by sending a signal to an actuator 154 operatively associated with a pumping element 126, which energized a coil in solenoid 156. The actuator 154 also includes an armature 166 which is drawn toward solenoid 156 allowing working fluid, such as hydraulic oil or diesel fuel, to flow through drain outlet 176. This reduces fluid pressure in valve bore 150 of the control valve 142 causing valve element 152 to open, as described above.

When valve element 152 opens, working fluid is allowed to flow from fluid supply passage 180 through the conduit supply passage 178 and into conduit passage 134. Under normal steady-state operating conditions, the conduit passage would normally be filled with material, in this case the working fluid, so that when the valve element 152 of control valve 142 opens, the material is subjected to the pressure of the working fluid. During transient conditions, such as at start up, controller 188 may sense a lack of pressure in conduit 132 and provide a signal to the actuator 154 to keep control valve 142 open to provide a "fill" period until a pressure threshold is reached.

When control valve 142 is open, the material 190 in the conduit 132 may transmit a force through the material 190 approximately equal to the product of the working fluid pressure and the cross-sectional area of the conduit passage 134. This force then acts upon the first surface 228 of the piston 222, urging the piston 222 downward, which in turn urges the plunger 204 downward, pressurizing LNG in the pumping chamber 238. Pressure may be intensified by decreasing the cross-sectional area of the plunger 204 and bore 200 relative to the piston 222. Pumping element 126 may be configured to deliver LNG at a predetermined pressure between approximately 10 MPa and 100 MPa, or more particularly, between approximately 25 MPa and 40 MPa.

When the pumping stroke is complete, the controller 188 sends a signal to the actuator 154 de-energizing the solenoid 156, which closes the control valve 142, putting valve element 152 into the drain position. Pressure from the LNG in the storage chamber 106 of the tank 102 is sufficient to produce a flow of LNG through the inlet check valve 240 and inlet port 236 into pumping chamber 238 where the pressure of the LNG acts upon the distal end 216 of plunger 204, urging the plunger 204 upward in a return or retract stroke. Alternatively, a spring 256 may apply an upward force to the plunger 204 assist during the return stroke.

Because the configuration of the cryogenic module 100 creates a thermal gradient along the length of the cryogenic pump 122, the material 190 in the conduit passage 134, in this case the working fluid, may be in a first state 192 (liquid) at the first end 136 (warm end) of the conduit 132. Likewise the material 190 may be in a second state 194 (solid or wax) at the second end 138 (cold end) of the conduit 132, with an intermediate state 196 (slush) in between. Therefore, during the return stroke, the plunger 204 urges the piston 222 upward, which in turn urges material 190 upward. Because the valve element 152 of the control valve 142 is in the drain position, material 190 in a liquid state 192 is allowed to flow through the conduit supply passage 178 to the control valve drain passage 182.

As should be apparent, each pumping element 126 repeats multiple pumping stroke/return stroke cycles during normal operation, with similar cycles repeated by multiple pumping elements 126 of the multi-element cryogenic pump 122 of the present disclosure. This cycling results in reciprocating motion of material 190 within the conduit passage 134 so that as the material solidifies at the cold end, the cyclical reciprocating movement prevents the material 190 from freezing to the inner sidewall of the conduit passage 134.

Additionally, as the cryogenic pump 122 cycles, material 190 may flow along an interface between the piston 222 and the conduit 132, and may be retained within grooves 226 and solidify like material 194. Solidified material 194 in grooves 226 then acts as a seal to mitigate further leakage of material. In the exemplary embodiment of the present disclosure, because material 190 may be hydraulic oil or diesel fuel, the solidified material 194 in grooves 226 may also provide lubrication to the piston 222/conduit 132 interface.

Likewise, material 190 may migrate into the plunger chamber 210 and along an interface between the plunger 204 and barrel 198, where it may be retained within grooves 218 and solidified. As with the piston 222 discussed above, solidified material 190 in grooves 218 may function as both a seal and a lubricant, mitigating further leakage of material into the pumping chamber 238 and leakage of LNG vapor out of the pumping chamber 238.

It will be apparent to those skilled in the art that various modifications and variations can be made in the disclosed cryogenic pump and system without departing from the scope of the disclosure. Other embodiments of the disclosed cryogenic pump system will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A drive assembly for a cryogenic pump having at least one pumping element, the at least one pumping element including a pressurization assembly configured to be submerged in a cryogenic liquid, the pressurization assembly including a barrel disposed within a casing, and a plunger disposed within a bore of the barrel, the barrel having an inlet and a discharge, the plunger having a plunger body and one or more circumferential grooves disposed about the plunger body, the plunger being configured for reciprocating movement within the barrel so that when the plunger is moving in a first retracting direction the cryogenic liquid is drawn into the bore, and when the plunger is moving in a second extending direction the cryogenic liquid is delivered from the discharge at a predetermined pressure, the drive assembly comprising:
    a hydraulic actuation assembly;
    a transmission assembly in communication between the pressurization assembly and the hydraulic actuation assembly, the transmission assembly including a conduit passage having a first end adjacent the hydraulic actuation assembly and a second end adjacent the pressurization assembly, the conduit passage configured to contain a material having a first state at the first end and a different second state at the second end, wherein the first state of the material contained in the conduit passage is a liquid state and the second state of the material contained in the conduit passage is a solid state; and
    a piston disposed within the conduit passage positioned at the second end, wherein the piston is configured to cooperate with the casing to form a seal between a wall of the conduit passage and a plunger chamber defined by a space between the plunger and the piston,
    wherein the piston includes a piston body and one or more circumferential grooves disposed about the piston body to receive the material as the cryogenic pump cycles such that the material flows along an interface between the piston and the wall of the conduit passage, is retained within the one or more circumferential grooves of the piston body, and solidifies in the one or more circumferential grooves of the piston body.

2. The drive assembly of claim 1, wherein the piston comprises:
    a first surface at a first end of the piston body in contact with the material contained within the conduit passage; and
    a second surface at a second end of the piston in contact with the plunger.

3. A cryogenic pump comprising:
    a pressurization assembly configured to be submerged in a cryogenic liquid;
    a hydraulic actuation assembly; and
    a transmission assembly in communication between the pressurization assembly and the hydraulic actuation assembly, the transmission assembly including a conduit passage having a first end adjacent the hydraulic actuation assembly and a second end adjacent the pressurization assembly, the conduit passage configured to contain a material having a first state at the first end and a different second state at the second end; and a piston disposed within the conduit passage, wherein the piston includes a piston body and one or more circumferential grooves disposed about the piston body to receive the material as the cryogenic pump cycles such that material flowing along an interface between the piston and the conduit passage, is retained within the one or more circumferential grooves, and solidifies in the one or more circumferential grooves.

4. The cryogenic pump of claim 3, wherein the first state of the material contained in the conduit passage is a liquid state.

5. The cryogenic pump of claim 4, wherein the second state of the material contained in the conduit passage is a solid state.

6. The cryogenic pump of claim 4, wherein the second state of the material contained in the conduit passage is a semi-solid state.

7. The cryogenic pump of claim 3, wherein the conduit passage is configured such that the material contained in the conduit passage includes an intermediate state disposed between the first state and the second state.

8. The cryogenic pump of claim 3, wherein the hydraulic actuation assembly includes a control valve in communication with a fluid source, wherein the control valve is selectably movable from a first configuration blocking fluid flow from the fluid source, to a second configuration allowing fluid flow from the fluid source to the first end of the conduit passage.

9. The cryogenic pump of claim 3, wherein the pressurization assembly includes a barrel and a plunger disposed within a bore of the barrel, the barrel having an inlet and a discharge, the plunger being configured for reciprocating movement within the barrel so that when the plunger is moving in a first retracting direction the cryogenic liquid is drawn into the bore and when the plunger is moving in a second extending direction the cryogenic liquid is delivered from the discharge at a predetermined pressure.

10. The cryogenic pump of claim 9, wherein the piston is disposed within the conduit passage positioned at the second end, the piston having a first surface in contact with the material contained within the conduit passage and a second surface in contact with the plunger.

11. The cryogenic pump of claim 10, further comprising a casing configured to receive the barrel, the casing and the barrel defining a plunger chamber, the casing and the piston configured to cooperate to form a seal between the conduit passage and the plunger chamber.

12. The cryogenic pump of claim 9, wherein the plunger further includes a plunger body and one or more circumferential grooves disposed about the plunger body to receive solidified material to act as a seal.

13. The cryogenic pump of claim 3 having a plurality of pumping elements,
wherein the pressurization assembly is a first pressurization assembly, the hydraulic assembly is a first hydraulic assembly, and the transmission assembly is a first transmission assembly, and
wherein each additional pumping element of the plurality of pumping elements comprises:
an additional pressurization assembly configured to be submerged in the cryogenic liquid, wherein each additional pressurization assembly includes a barrel and a plunger disposed within a bore of the barrel, the barrel having an inlet and a discharge, the plunger being configured for reciprocating movement within the barrel so that when the plunger is moving in a first retracting direction the cryogenic liquid is drawn into the bore and when the plunger is moving in a second extending direction the cryogenic liquid is delivered from the discharge at a predetermined pressure;
an additional hydraulic actuation assembly; and
an additional transmission assembly in communication between the additional pressurization assembly and the additional hydraulic actuation assembly of a respective pumping element, each additional transmission assembly including an additional conduit passage having a first end adjacent the additional hydraulic actuation assembly and a second end adjacent the additional pressurization assembly, the additional conduit passage configured to contain the material being in a first liquid state at the first end and the different second state at the second end;
wherein each additional hydraulic actuation assembly includes a control valve in communication with a fluid source, wherein the control valve is selectably movable from a first configuration blocking fluid flow from the fluid source, to a second configuration allowing fluid flow from the fluid source to the first end of the additional conduit passage.

14. The cryogenic pump of claim 13, wherein the second state of the material contained in the conduit passage is a solid state.

15. The cryogenic pump of claim 13, wherein the second state of the material contained in the conduit passage is a semi-solid state.

16. The cryogenic pump of claim 3, wherein the piston is configured to cooperate with a casing to form a seal between the conduit passage and a plunger chamber defined by a space between the plunger and the piston.

17. A cryogenic module comprising:
a tank configured to hold a liquid at cryogenic temperatures and pressures, the tank including:
an envelope defining a storage chamber therein,
a socket including a flange attached to the envelope and a wall segment extending from the flange into the storage chamber;
a cryogenic pump configured to cooperate with the socket, the cryogenic pump including:
a pressurization assembly configured to be submerged in the liquid,
a hydraulic actuation assembly,
a transmission assembly in communication between the pressurization assembly and the hydraulic actuation assembly, the transmission assembly including a conduit passage having a first end adjacent the hydraulic actuation assembly and a second end adjacent the pressurization assembly, the conduit passage configured to contain a material being in a first liquid state at the first end and a different second state at the second end; and
a piston disposed within the conduit passage positioned at the second end, wherein the piston is configured to cooperate with a casing to form a seal between the conduit passage and a plunger chamber defined by a space between a plunger and the piston.

18. The cryogenic module of claim 17, wherein the second state of the material contained in the conduit passage is a solid state.

19. The cryogenic module of claim 17, wherein the second state of the material contained in the conduit passage is a semi-solid state.

20. The cryogenic module of claim 17, wherein the cryogenic pump comprises a plurality of pumping elements,
wherein the pressurization assembly is a first pressurization assembly, the hydraulic assembly is a first hydraulic assembly, and the transmission assembly is a first transmission assembly, and
wherein each additional pumping element of the plurality of pumping elements comprises:
an additional pressurization assembly configured to be submerged in the liquid, wherein each additional pressurization assembly includes a barrel and a plunger disposed within a bore of the barrel, the barrel having an inlet and a discharge, the plunger being configured for reciprocating movement within the barrel so that when the plunger is moving in a first retracting direction the liquid is drawn into the bore, and when the plunger is moving in a second extending direction the liquid is delivered from the discharge at a predetermined pressure;
an additional hydraulic actuation assembly, wherein each additional hydraulic actuation assembly includes a control valve in communication with a fluid source, wherein the control valve is selectably movable from a first configuration blocking fluid flow from the fluid source, to a second configuration allowing fluid flow from the fluid source to the first end of the additional conduit passage; and
an additional transmission assembly in communication between the additional pressurization assembly and the additional hydraulic actuation assembly, each additional transmission assembly including an additional conduit passage having a first end adjacent the additional hydraulic actuation assembly and a second end adjacent the additional pressurization assembly, the additional conduit passage configured to contain the material being in the first liquid state at the first end, the different second state at the second end, and a mixed intermediate state between the first liquid state and the second state.

* * * * *